May 3, 1932. H. L. RUSSELL 1,856,193
SUPERCHARGER FOR AIRPLANE ENGINES
Filed July 13, 1929

INVENTOR
H. L. Russell
BY
ATTORNEY

Patented May 3, 1932

1,856,193

UNITED STATES PATENT OFFICE

HARRY L. RUSSELL, OF DEARBORN, MICHIGAN, ASSIGNOR TO FORD MOTOR COMPANY, OF DEARBORN, MICHIGAN, A CORPORATION OF DELAWARE

SUPERCHARGER FOR AIRPLANE ENGINES

Application filed July 13, 1929. Serial No. 377,992.

The object of my invention is to provide a supercharger for airplane engines of simple, durable and inexpensive construction.

A further object of my invention is to provide a supercharger for airplane engines which will utilize the slipstream created by the airplane propeller for forcing air through the engine carburetor.

Still, a further object of my invention is to provide a supercharger for airplane engines having an air intake placed above the engine so that the dust, raised by the propeller when the plane is taking off or landing, will not be drawn into the engine carburetor.

The ordinary airplane engine is provided with a carburetor placed beneath the engine and having an air intake adjacent to the carburetor. When the engine is started a cloud of dust is raised by the propeller and is blown directly on the carburetor intake. The dust is of course detrimental to the motor and considerable damage is done by this dust.

In the applicant's device, the carburetor is still placed beneath the motor but an intake pipe extends from the carburetor to a position above the engine. An air scoop is provided on the upper end of this intake pipe which faces the engine propeller so that the air from the slipstream will be forced into the engine carburetor through the intake pipe and air scoop. Practically no dust enters the scoop because of its position above the engine. The dust is picked up from several feet in front of the propeller and thrown back by the bottom half of the propeller. The air entering the scoop is thus dust free. This advantage is of course obtained without the use of air cleaners, filters, or the like.

Figure 1:
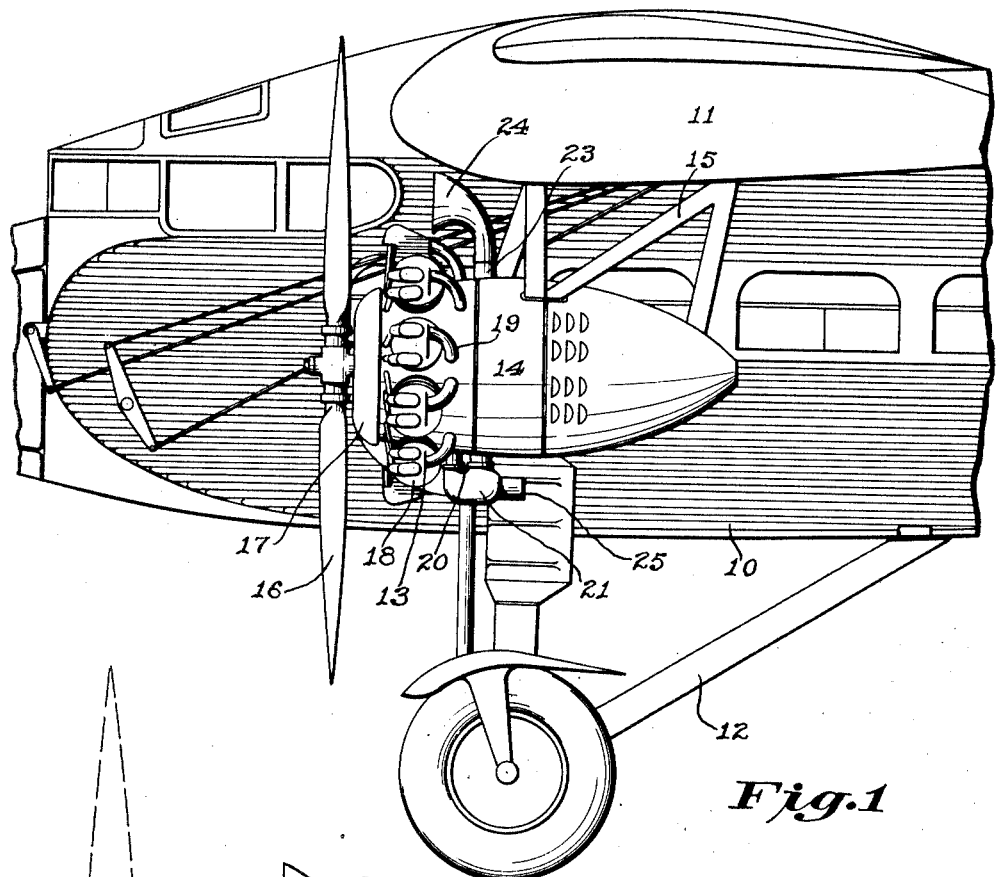
Figure 2:
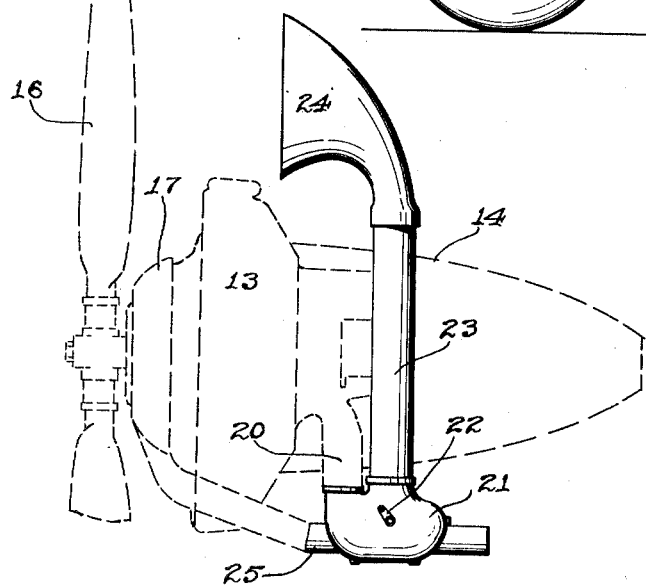

With these and other objects in view, my invention consists in the arrangement, construction, and combination, of the various parts of my improved device, as described in the specification, claimed in my claim, and illustrated in the accompanying drawings, in which:

Figure 1 shows a fragmentary view of an airplane having my improved supercharger mounted on one of the wing motors, and Figure 2 shows a side elevation of the supercharger and carburetor, parts of the airplane being shown in dotted lines to better illustrate the operation.

Referring to the accompanying drawings, I have used the reference numeral 10 to indicate generally the fuselage of an airplane having a pair of wings 11 and a landing gear 12. A radial motor 13 is secured to an engine nacelle 14 which is suspended beneath the wings 11 by several struts 15. These struts are secured to the engine nacelle and to the lower part of the wing 11 thereby securing the nacelle in position.

The motor 13 is provided with a propeller 16 at its forward end, and is also provided with an exhaust ring 17 disposed on the forward side of the motor directly in the rear of the propeller. The motor 13 is of the radial type having a plurality of radially disposed cylinders 18 provided with individual intake mixture pipes 19 which connect with a common intake mixture pipe 20. This intake mixture pipe 20 extends downwardly to the underside of the nacelle 14 where it is secured to an engine carburetor 21.

The carburetor 21 is of the conventional type having a control valve 22 which regulates the flow of gas therethrough. An air intake pipe 23 extends upwardly from the carburetor 21 through the nacelle 14 to a position adjacent to the top of the motor 13. A scoop 24 is secured to the upper end of the pipe 23 and is placed in position with its open end toward the propeller 16.

An exhaust pipe 25 extends from the exhaust ring 17 through the carburetor 21 and a short distance to the rear thereof. This exhaust pipe heats the incoming air for the carburetor so that better vaporization of the fuel is secured.

When the motor 13 is in operation, the exhaust gases are forced through the exhaust ring 17 and then through the exhaust pipe 25 to the rear of the engine nacelle 14. The slipstream created by the propeller 16 forces air rearwardly into the scoop 24 and then through the pipe 23 to the carburetor 21 where it is heated by the exhaust pipe 25. The heated air is then mixed with fuel and enters the intake mixture pipe 20 where it is rationed to each cylinder by the individual intake mixture pipes 19.

Several advantages arise through the use of my improved device, one of these advantages being that a considerable air intake pressure is obtained without the use of any additional rotating parts to the airplane engine. An increased power output is thus obtained from the motor. Further, the air intake for my improved supercharger is rendered dust free without the use of air cleaners, filters, or the like.

Some changes may be made in the arrangement, construction, and combination, of the various parts of my improved device, and it is my intention to cover by my claim, such changes as may reasonably be included within the scope thereof.

I claim as my invention:

In an airplane engine supercharger, an airplane having a pair of wings, an engine nacelle suspended beneath the under side of each of said wings, a radial type airplane engine secured to the forward end of each nacelle, an airplane propeller driven by each of said engines, an engine carburetor disposed entirely beneath the under side of each of said nacelles so as to be readily accessible for adjustment from the ground, an air scoop disposed in the slip stream of each propeller directly above the adjacent engine nacelle, and a vertical air intake pipe extending through each of said nacelles so as to connect each of said air scoops with the adjacent carburetor so that dust free air will be drawn into said carburetors even though they are disposed beneath the engine nacelles and in the occasionally dust enclosed lower portions of the propeller slip streams.

HARRY L. RUSSELL.